(No Model.)

J. T. CONNELLY.
DEVICE FOR TAPPING STAY BOLT HOLES.

No. 475,672. Patented May 24, 1892.

Witnesses
Inventor
By his Attorney

UNITED STATES PATENT OFFICE.

JAMES T. CONNELLY, OF MILTON, PENNSYLVANIA.

DEVICE FOR TAPPING STAY-BOLT HOLES.

SPECIFICATION forming part of Letters Patent No. 475,672, dated May 24, 1892.

Application filed December 28, 1891. Serial No. 416,321. (No model.)

*To all whom it may concern:*

Be it known that I, JAMES T. CONNELLY, a citizen of the United States, residing at Milton, in the county of Northumberland and State of Pennsylvania, have invented certain new and useful Improvements in Devices for Tapping Stay-Bolt Holes; and I do hereby declare that the following is a full, clear, and exact description of the invention, which will enable others skilled in the art to which it appertains to make and use the same.

This invention relates to screw-tap devices for threading the stay-bolt holes in the inner and outer sheets of locomotive fire-boxes, boilers, &c., where such stay-bolt holes are behind the frame-work; and it consists in certain improvements in the class of tapping devices covered by my patent, No. 373,815, granted November 29, 1887.

The object of the present invention is to provide a simple and improved construction of this character embodying but a single spindle adapted to be used in threading both the corresponding stay-bolt holes in the inner and outer sheets and without removal of the spindle, thereby greatly reducing the labor and time required.

A further object of the invention is to provide two screw-taps designed to thread the holes in the inner and outer sheets, respectively, and of such construction as will greatly facilitate the operation and insure accuracy.

Figure 1:
Figure 2:
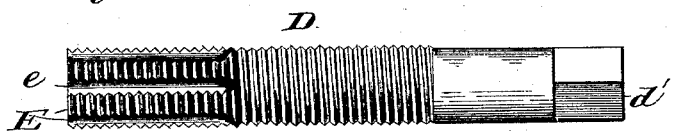
Figure 3:
Figure 4:
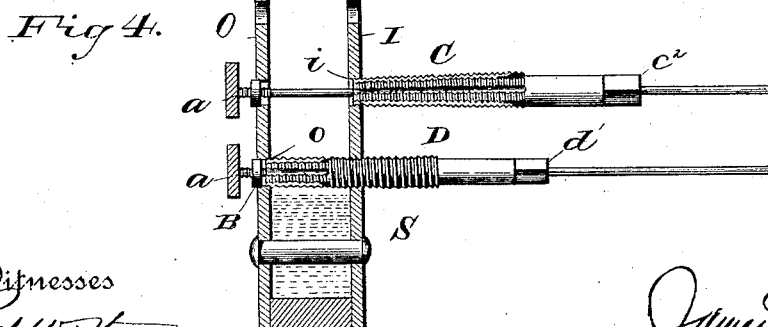

In the drawings, Figure 1 is a side elevation of the tap used in threading stay-bolt holes in the inner sheet. Fig. 2 is a similar view of the tap used for threading the holes in the outer sheet. Fig. 3 is a similar view of the spindle designed to be used in connection with both taps. Fig. 4 is a sectional view of a locomotive fire-box, illustrating the operation of the device in different stages of completion.

Corresponding parts in the figures are denoted by the same letters of reference.

In my previous Letters Patent above noted I have shown a simple tubular tap having an internal longitudinal smooth bore and external longitudinal channels extending throughout the threaded portion. In connection with this tap two spindles are used, one of said spindles having a tubular enlargement at one end and the other being of the same diameter throughout its length, both being adapted to fit within the bore of the tap. In the practical operation of this tool the spindle having the enlargement is first passed through one of the stay-bolt holes in the inner sheet and said enlargement seated in the corresponding hole in the outer sheet, when the tap is placed upon the inner end of the spindle and the nearer hole threaded. When this has been accomplished, it then becomes necessary to remove the spindle and substitute the second spindle, the tap being then applied to the latter and the hole in the outer sheet threaded in the same manner, the tap playing in the threaded hole in the inner sheet. The device just referred to is, however, to a degree objectionable, first, in that two spindles are used requiring the time and labor incident to an interchange of spindles in threading each pair of stay-bolt holes; second, the tap being tubular or of the same diameter throughout its threaded portion it does not readily enter the holes in the inner sheet nor serve to cut the threads therein with dispatch; third, the tap being channeled throughout its threaded portion, in threading a hole in the outer sheet the threads of the portion of the tap playing in the threaded hole of the inner sheet (which are designed to merely serve the office of feeding the tap to the hole in the outer sheet and perform no cutting function) are broken at intervals by the channels, and are consequently weakened, and do not therefore possess the strength and rigidity of unbroken threads, and, fourth, the spindle used in boring the holes in the outer sheet having no enlargement, it does not fit closely within said holes and serve as a true guide for the tap, accuracy being thus dependent upon the skill of the operator.

The office of my present invention is to entirely eradicate the objections above mentioned and to produce a tool of this character which will be thoroughly practicable, durable, and of the highest efficiency, as will hereinafter fully appear.

Referring to the drawings, A designates a spindle, which is of cylindrical form and of any desired length. The spindle A is of the same diameter throughout its length, and is provided at one end with exterior screwthreads $a$. Upon the latter end is removably disposed a nut B of cylindrical form and provided with a central threaded eye for receiving the threaded end of the spindle. The nut B is of a diameter approximating that of the stay-bolt holes, so that when placed therein it serves to retain the spindle against any lateral play.

C designates a tap designed for threading the holes in the inner sheet, and comprises a threaded portion $c$, tapering toward its outer end and channeled throughout its length in any suitable or well-known manner. The tap C is provided with a central longitudinal bore $c'$, extending from end to end and of such a diameter as to receive the spindle and adapt the tap to work thereon. The unthreaded end of the tap is formed angular, as shown at $c^2$, for the reception of an operating-wrench.

For threading the holes in the outer sheet a tap D is employed. The latter is of the same general structure as the tap C, having a central longitudinal bore and an angular end $d'$. The threaded portion E, however, of the tap D is of the same diameter throughout its length, and said portion is provided with longitudinally-arranged channels $e$, beginning at the free end of the threaded portion and terminating, preferably, in advance of the center thereof, the purpose of which will appear farther on.

The operation of my invention will be best understood by referring to Fig. 4 of the drawings, in which I and O designate, respectively, the inner and outer sheets of a locomotive fire-box, S the frame-work, and $i\ o$ the stay-bolt holes in the inner and outer sheets, respectively, said holes being shown as drilled ready for threading. In practice to thread the holes behind the frame-work the end of the spindle carrying the nut is first passed through the inner sheet and then the outer sheet, the nut having been previously adjusted upon the spindle, so that when the latter bears against the frame-work the nut projects partially without the stay-bolt hole in the outer sheet. With the spindle in this position the tap C is applied to its inner end and the tap turned by means of a wrench to thread the hole in the inner sheet. By forming the threaded portion of the tap C tapering the smaller end is readily inserted in the hole to be threaded thereby, and as the tap is fed forward the threads are cut gradually deeper in the stay-bolt hole with but little labor, and consequently with dispatch. When the operation of threading the hole in the inner sheet has been completed, the tap C is removed from the spindle and the tap D substituted. The latter is screwed through the previously-threaded hole and is guided by the spindle to the coincident hole in the outer sheet. The tap having reached this point the channels thereof have passed entirely beyond the inner sheet, the unbroken threads of the tap are in engagement with the threaded hole of the inner sheet, and the purchase of the tap in the latter is thus greatly strengthened. The tap is then by turning fed forward without pressure to thread the hole in the outer sheet. When the tap comes close upon the spindle-nut, the spindle is pulled inward to bind the nut against the tap and then turned to release the nut from the spindle and permit the former to drop at the exterior of the fire-box. The tap D having now a firm bearing in proper alignment is free to complete the threading of the hole in the outer sheet.

By the employment of a tool constructed in accordance with my present invention a series of taps for threading stay-bolt holes of varying sizes may be employed with the same spindle, it being simply necessary to provide a set of nuts corresponding to the different diameters of bolt-holes.

I claim as my invention—

1. The combination, with a spindle and a cylindrical nut adjustably and removably mounted thereon, of a screw-tap provided with a central longitudinal bore adapted to receive said spindle, substantially as set forth.

2. The combination, with a spindle and an adjustable nut carried thereby, of a screw-tap having its threaded portion of a corresponding diameter throughout its length, the free end only of the threaded portion being channeled, substantially as and for the purpose set forth.

3. The combination, with a spindle having a cylindrical nut adjustably and removably mounted thereon, of a screw-tap having a channeled-threaded portion and an unbroken threaded portion and provided with a central longitudinal bore for receiving the spindle, substantially as and for the purpose set forth.

In testimony whereof I affix my signature in presence of two witnesses.

JAMES T. CONNELLY.

Witnesses:
W. H. DICKINSON,
JOS. ANGSTADT.